US012604906B2

(12) United States Patent
Rodríguez et al.

(10) Patent No.: US 12,604,906 B2
(45) Date of Patent: Apr. 21, 2026

(54) MULTI-TEXTURE CONFECTIONERY PRODUCT

(71) Applicant: SOCIÉTÉ DES PRODUITS NESTLÉ S.A., Vevey (CH)

(72) Inventors: Andrés Ricardo Rosende Rodríguez, Santiago (CL); Jennifer Ramirez, La florida (CL); Jaime Henriquez, Santiago (CL); Juan Rubilar, Santiago (CL)

(73) Assignee: Societe des Produits Nestle S.A., Vevey (CH)

( * ) Notice: Subject to any disclaimer, the term of this patent is extended or adjusted under 35 U.S.C. 154(b) by 420 days.

(21) Appl. No.: 18/117,790

(22) Filed: Mar. 6, 2023

(65) Prior Publication Data

US 2023/0345952 A1 Nov. 2, 2023

(51) Int. Cl.

| | |
|---|---|
| *A21D 13/11* | (2017.01) |
| *A21D 2/16* | (2006.01) |
| *A21D 2/18* | (2006.01) |
| *A21D 8/02* | (2006.01) |
| *A21D 10/00* | (2006.01) |
| *A21D 13/80* | (2017.01) |

(52) U.S. Cl.
CPC .............. *A21D 13/11* (2017.01); *A21D 2/165* (2013.01); *A21D 2/181* (2013.01); *A21D 8/02* (2013.01); *A21D 10/002* (2013.01); *A21D 13/80* (2017.01)

(58) Field of Classification Search
CPC ........ A21D 13/11; A21D 13/80; A21D 2/181; A21D 10/002
See application file for complete search history.

(56) References Cited

U.S. PATENT DOCUMENTS

| | | | |
|---|---|---|---|
| 4,562,080 A | 12/1985 | Tenn | |
| 4,910,029 A * | 3/1990 | Thulin | ................... A21D 13/11 426/549 |
| 2008/0274251 A1* | 11/2008 | Paulson | ............... A21D 10/025 426/549 |
| 2017/0094982 A1 | 4/2017 | Roussel et al. | |

FOREIGN PATENT DOCUMENTS

WO 2005006880 1/2005

OTHER PUBLICATIONS

Richardson, et al. "The impact of sugar particle size manipulation on the physical and sensory properties of chocolate brownies". Available online as of Apr. 16, 2018. LWT—Food Science and Technology, 95 (2018), 51-57. (Year: 2018).*

(Continued)

*Primary Examiner* — Jenna A Watts
(74) *Attorney, Agent, or Firm* — K&L Gates LLP

(57) ABSTRACT

The present invention relates to multi-texture baked products and precursors for making such baked products. In particular this invention relates to a cookie precursor comprising a dough, wherein the dough comprises particle sugar with a particle size D90 of less than 700 μm, a sugar syrup and a sugar alcohol, wherein the dry weight ratio of particle sugar to sugar in the sugar syrup is 4.75 or below and the weight ratio of particle sugar to sugar alcohol is 4.6 or below.

16 Claims, 1 Drawing Sheet

(56) References Cited

OTHER PUBLICATIONS

Shoemaker, "Dextrose vs. glucose: are these sugars equal?" Available online as of Feb. 24, 2021 from https://www.livestrong.com. pp. 1-7. (Year: 2021).*

European Search Report for Eruopean Appl No. EP 22 17 0972 dated Oct. 13, 2022.

Communication for the Extended Search Report for Appl No. 22170972.8-1105.

Communication of Application documents for Appl No. 22 170 972.8.

NPL copyright statement.

Information Search Report for European Application No. EP 22 17 0972.

Anonymous: "Sugar", 2022, XP55968657, Retrieved from the Internet: URL:https://www.sympatec.com/en/applications/sugar/ #[retrieved on Oct. 6, 2022 *second graph on p. 2*.

European Search Report for Eruopean Appl No. EP 22 17 0972 dated Oct. 14, 2022.

* cited by examiner

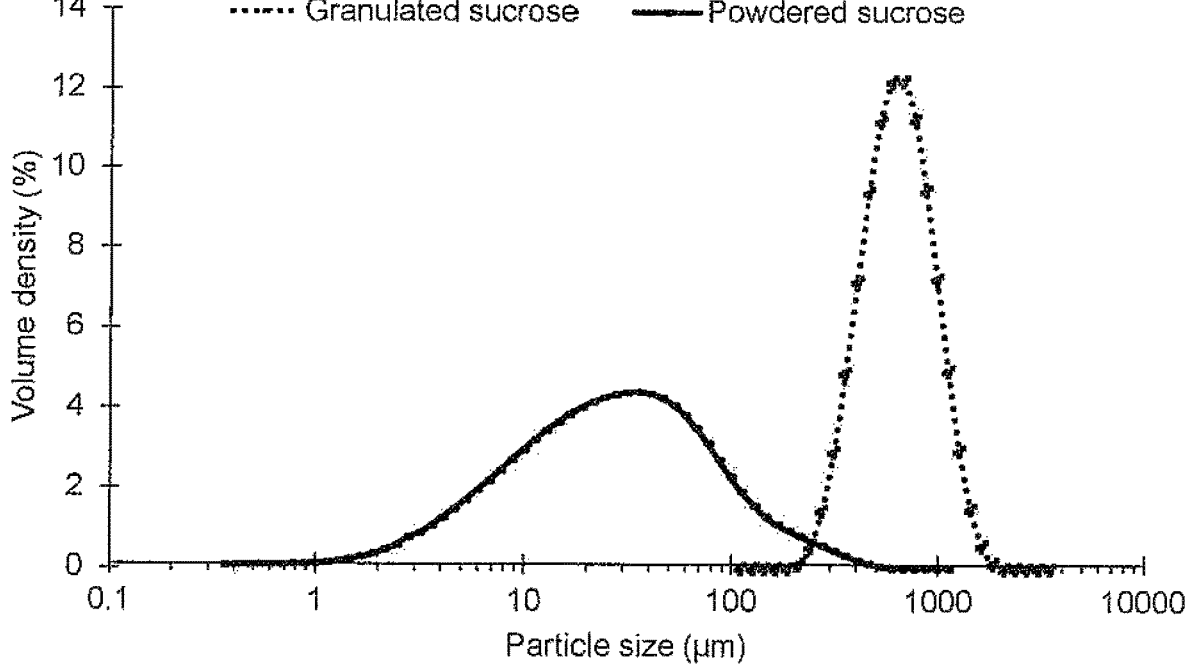

MULTI-TEXTURE CONFECTIONERY PRODUCT

CROSS-REFERENCE TO RELATED APPLICATIONS

The present application claims priority to European Patent Application No. 22170972.8 filed on Apr. 29, 2022, the entire contents of which are incorporated herein by reference.

FIELD OF THE INVENTION

The present invention relates to a cookie precursor and a baked cookie product. In particular, the invention relates to a cookie product that has a texture contrast similar to that of a freshly baked cookie, while achieving long-lasting shelf stability.

BACKGROUND OF THE INVENTION

Freshly baked cookies have a highly desirable texture, but this is lost over time due to staling and moisture loss. In particular, a fresh cookie may have a crispy or crunchy outer edge, but a softer, chewy centre. It is particularly desirable in some cases that the centre has a texture approaching that of the uncooked cookie dough. It is known, however, that although such products exhibit this multi-textured structure when freshly baked, moisture transfer and loss during storage lead to the product becoming dry and unappetising. In fact, the majority of cookie products that are sold with a long shelf life, pre-packaged and ready to eat, are mono-texture; i.e. they are either crispy throughout, or remain soft and chewy with no crispy crust.

There have been attempts to create shelf-stable baked goods where a product has different textures, such as crispy and chewy portions, however, these have not been successful and have not produced a baked cookie product that is preferred by the consumer. U.S. Pat. No. 4,717,570 discloses multi-textured cookies having a soft and moist centre containing a humectant and a firm outer layer containing a mixture of casein and an edible, water-soluble phosphate. U.S. Pat. No. 4,840,803 discloses a multi-textured cookie having a soft and moist centre containing a humectant and a firm outer layer containing a hard vegetable fat. U.S. Pat. No. 4,910,029 discloses a cookie having a plurality of textures and visually apparent flavour chips. U.S. Pat. Nos. 4,961,941 and 4,961,942 disclose a cookie having a plurality of textures. The cookie has an inner layer that includes a humectant and a water content that is greater than that of the outer layer.

It is known to provide cookie products by coextruding two doughs. For example, U.S. Pat. No. 4,584,203 discloses a method of forming a cookie using two doughs. This allows for the provision of doughs, which when baked, exhibit different textures. It is attempted to ensure that the inner dough remains chewy through the addition of a humectant, in quantities greater than in the external dough. Additionally, EP0181821 and EP0031718 also rely on the use of humectants and distinct dough recipes to attempt to provide a chewy inner dough texturally different from the external dough once baked.

WO 2015/180975 discloses multi-texture cookies made from an inner and an outer dough.

Other solutions to providing simultaneously a crispy and a chewy texture include using fat or fruit-based fillings to give an impression of moistness. Alternatively, the addition of different ingredients such as inclusions, hydrocolloids, humectants, gums and sugar crystallization inhibitors (such as fructose or dextrose) to reinforce either the crunchiness of the outer crust or the softness of the cookie centre has been used. However, these solutions are detrimental to the appearance, taste and/or texture. In the case of using fillings, these would provide a product with a substantially heterogeneous cross section relative to the flavour and appearance of the cookie, which is off putting to the consumer.

None of the aforementioned prior art has been able to replicate the much sought-after texture profile of a freshly baked cookie product, that has a shelf life comparable to that of traditional mono-texture store bought cookies.

Almost all feasible cookie formulations which get crisp on the outside will eventually have their texture equalised and reach that same level of crispness throughout. This occurs through water loss and sugar crystallization, to give the cookie the dry, hard texture that is characteristic of popular ready-to-serve cookies. Most home baked cookies will reach this totally crisp state within a week, regardless of the temperature or relative humidity at which they are stored, since the changes involved in cookie hardening are internal to the cookie and are thus independent of the cookie's external environment.

There is a need for an improved, multi-texture cookie that provides an eating experience to the consumer replicating that of eating a freshly baked cookie, that can be stored at ambient temperatures and a consumer can buy off the shelf with no need to bake at home. For added convenience, economic reality, and for culinary delight, it is therefore desirable to have available previously baked products that retain their fresh baked character over time without deterioration of desired organoleptic properties. Thus, there remains a need for methods to provide such a shelf stable baked product that retains the character of a fresh baked product. The present invention teaches such methods without the aforementioned disadvantages of existing products and methods.

SUMMARY OF THE INVENTION

The present inventors have found by using particular particle size ranges of sugar, in combination with particular amounts of sugar syrup and sugar alcohol, that the texture changes of cookies following baking can be minimized. Surprisingly, the present inventors have been able to overcome the problems of creating a shelf stable cookie with a freshly baked texture through using sugar of a fine particle size, with a sugar syrup and sugar alcohol. The present invention avoids the need for a lengthy ingredient list and the cookie precursor once baked produces a cookie with a soft doughy centre and a crisp outer shell that can be maintained during long term storage. Furthermore, the cookies may be produced by particular methods on small to commercially industrial scale with excellent processability.

In a first aspect, the invention provides a cookie precursor comprising a dough, wherein the dough comprises particle sugar with a particle size D90 of less than 700 $\mu$m, a sugar syrup and a sugar alcohol, wherein the dry weight ratio of particle sugar to sugar in the sugar syrup is 4.75 or below and the weight ratio of particle sugar to sugar alcohol is 4.6 or below.

In a second aspect, the invention provides a cookie precursor comprising a first dough and a second dough, wherein the first dough is the dough as defined in the first aspect.

In a third aspect, the invention provides a cookie obtainable by baking the cookie precursor according to the first and second aspects.

In a fourth aspect, the invention provides a cookie comprising particle sugar with a particle size D90 of less than 700 μm, a sugar syrup and a sugar alcohol, wherein the dry weight ratio of particle sugar to sugar in the sugar syrup is 4.75 or below and the weight ratio of particle sugar to sugar alcohol is 4.6 or below.

DESCRIPTION OF THE DRAWINGS

FIG. 1—Particle size distributions of powdered and granulated sucrose measured by means of light scattering using the Mie diffraction theory, with a particle size D90 of 98 μm and 978 μm, respectively.

DETAILED DESCRIPTION OF THE INVENTION

It must be noted that as used herein and in the appended claims, the singular forms "a", "an", and "the" include plural referents unless the context clearly dictates otherwise.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

The term "consists essentially of" means that specific further components can be present, wherein the further components do not materially affect the essential characteristics of the compositions or the products obtainable by the claimed processes.

The % values are in weight/weight %, which is used interchangeably with wt %, unless otherwise specified. This disclosure is not limited by the exemplary methods and materials disclosed herein, and any methods and materials similar or equivalent to those described herein can be employed.

The terms "first dough", "internal dough" and "inner dough" are used interchangeably in this disclosure. These terms are used to refer to the dough which forms, after baking, the softer and chewy portion of the multi-texture cookie described herein.

Similarly, the terms "second dough", "external dough" and "outer dough" are used interchangeably in this disclosure. These terms are used to refer to the dough which forms, after baking, the crispy and crunchier portion of the multi-texture cookie described herein.

As will be appreciated, a "dough" refers to the hydrated malleable formulation which is ready to be baked and does not include dry mixes of the ingredients per se. Typically, it is well known that doughs have a total water content of about 1 to 20 wt, preferably about 2 to 18 wt %, most preferably 4 to 15 wt % based on the weight of the dough.

By "shelf stable" is meant that the cookies produced by the practice of this invention, after equilibration, retain a plurality of textures for longer than 1 week. Preferably, cookies prepared by the practice of this invention will, after equilibration, retain their original texture for at least 2-4 months, preferably for at least 9 months, preferably up to one year, with proper packaging and maintenance of packaging integrity. This is to be distinguished from those cookies which lose their texture differences over a period of up to a week, even when stored in air- and moisture-tight containers. Clearly, it is also to be distinguished from those cookies which are baked to have a mono-texture in production and are either continuously hard or continuously soft from baking through storage.

As used herein, a "cookie" is defined as a sweet biscuit. A biscuit is a small, flat cake that is dry and crisp and usually sweet. "Sweet" food contains sugar, typically a high amount of sugar, and has a taste similar to that of sugar, not bitter or salty.

Cookies are well known in the art and are typically made from at least flour and sugar and optionally fat and/or eggs additionally. Cookies are often found with one or more inclusions, such as chocolate chips or raisins. Commercially bought cookies tend to have a hard texture throughout the cookie, whereas home-made or freshly baked cookies typically exhibit multiple textures, from a soft and doughy centre to a harder, crisp outer shell.

A cookie precursor, as used herein, comprises a dough which when baked will form a cookie. The cookie precursor may also include inclusions.

Particle Sugar

As used herein, the term "particle sugar" refers to a crystalline sugar that has a measurable particle size and is added to the dough in the form of a powder or granules. This is in contrast to a sugar added to the dough in a liquid suspension.

As mentioned above, the process of the invention comprises preparing a cookie precursor comprising a particle sugar having a particle size (D90) of less than 700 μm. Such particle sugar having the particle size must be a solid sugar, but can be any suitable solid sugar, particularly brown sugar, sucrose, dextrose, fructose, glucose, lactose, maltose, malt sugar, raw sugar, turbinado sugar, and trehalose. Most preferably, the particle sugar comprises or consists of sucrose.

In a preferred embodiment, sugar content embodiments below relate to the first dough, i.e. preferably the inner dough, i.e. for certainty, not the total sugar content of the entire cookie precursor but the sugar content of the first dough only.

In an embodiment, the cookie precursor comprises about 5 to about 35 wt % particle sugar relative to the total weight of the dough.

For example, the cookie precursor may comprise about 5 wt % to about 33 wt %, about 5 wt % to about 30 wt %, about 5 wt % to about 27 wt %, about 5 wt % to about 25 wt %, or about 5 wt % to about 24 wt % particle sugar relative to the total weight of the dough.

In an embodiment, the cookie precursor may comprise about 10 wt % to about 33 wt %, about 10 wt % to about 30 wt %, about 10 wt % to about 27 wt %, about 10 wt % to about 25 wt %, or about 10 wt % to about 24 wt %, particle sugar relative to the total weight of the dough.

For example, the cookie precursor may comprise about 15 wt % to about 33 wt %, about 15 wt % to about 30 wt %, about 15 wt % to about 27 wt %, or about 15 wt % to about 25 wt % particle sugar, or about 15 wt % to about 24 wt % particle sugar relative to the total weight of the dough.

For example, the cookie precursor may comprise about 18 wt % to about 33 wt %, about 18 wt % to about 30 wt %, about 18 wt % to about 28 wt %, or about 18 wt % to about 28 wt % particle sugar, or about 18 wt % to about 24 wt % particle sugar, or about 18 wt % to about 23 wt % particle sugar, or about 18 wt % to about 21 wt % particle sugar, relative to the total weight of the dough.

5

For example, the cookie precursor may comprise about 15 wt %, about 18 wt %, about 20 wt %, about 22 wt %, about 23 wt %, about 25 wt %, or about 30 wt % particle sugar relative to the total weight of the dough.

Preferably, the cookie precursor comprises about 10 wt % to about 30 wt %, more preferably about 15 wt % to about 26 wt %, most preferably about 18 wt % to about 24 wt %, particle sugar relative to the total weight of the dough.

If the amount of particle sugar falls outside of the ranges above, when the cookie precursors are baked the cookies are hard and dry and do not have the desired textures when consumed.

The particle sugar may preferably be a powdered sugar. More preferably, the particle sugar is powdered sugar with low moisture content.

Preferably, the added sugar has a total moisture content of about 0.01 wt % to about 5.0 wt %, preferably about 0.25 wt % to about 3.0 wt %, or about 0.5 wt % to about 2 wt %, based on the weight of the added sugar. Any suitable method for measuring this moisture content is applicable, for instance, by thermogravimetric analysis, e.g. using a drying oven and calculating a loss on drying, or using an infra-red moisture analyser.

Preferably, the added sugar moisture content is measured by thermogravimetric analysis, using a HB43 halogen moisture analyser (METTLER TOLEDO, USA), where 5 g of sample is heated at 125° C. with switch-off criterion 3, in triplicate.

Unless otherwise indicated, particle size and particle size distributions may be measured by any appropriate method. For example, laser diffraction or microscopic analysis, preferably laser diffraction, may be used to measure the particle size of microparticles (microparticulates) and dynamic light scattering may be used to measure the particle size of nanoparticles (nanoparticulates).

For microparticulates (e.g. particularly particles of 1 micron or greater, and preferably 1 to 1000 microns), particle size distribution is preferably measured by laser light diffraction, e.g. using a Mastersizer 3000, Malvern Instruments Ltd, Malvern UK with Fraunhoffer theory or Mie theory (absorption index 0.01, RI sucrose 1.538) in a "wet system" using a Hydro SM attachment and AAK Akomed R MCT oil dispersant RI 1.45. In a "wet system", the sample is placed in the MCT oil and sonicated for 2 minutes with an ultrasonic probe before being run in the Malvern 3000 with a Hydro SM wet dispersion unit, in duplicate. In a "dry system", the sample is placed into the Aero S automatic dry dispersion unit before being run in the Malvern 3000, in duplicate. The particle sizes obtained using the above methods were not significantly different for the present invention. However, preferably, a Mie theory, dry system is used, as in the examples.

The term Dx means that x % of the particles (based on volume) has a diameter of or below a specified D value. Thus, by way of example, a D90 of 700 μm means that 90% of the particles, by volume, have a diameter of or below 700 μm, and a D50 of 400 μm means that 50% of the particles, by volume, have a diameter of or below 400 μm.

FIG. 1 provides the particle size distribution of powdered and granulated sucrose, with a particle size D90 of 98 μm and 978 μm, respectively.

The particle sugar may have a particle size D10 of about 1.5 μm to about 10 μm. For example, the particle sugar may have a particle size D10 of about 1.5 μm to about 7.5 μm, about 1.5 μm to about 5 μm, or about 1.5 μm to about 2.5 μm. For example, the particle sugar may have a particle size D10 of about 2.5 μm to about 10 μm, about 2.5 μm to about 7.5 μm, or about 2.5 μm to about 5 μm. For example, the particle sugar may have a particle size D10 of about 5 μm to about 10 μm, or about 5 μm to about 7.5 μm. For example, the particle sugar may have a particle size D10 of about 7.5 μm to about 10 μm.

Preferably, the particle sugar has a particle size D10 about 2.0 μm to about 7.5 μm, more preferably about 2.5 μm to about 5 μm. The particle sugar may have a particle size D50 of about 5 μm to about 50 μm. For example, the particle sugar may have a particle size D50 of about 5 μm to about 45 μm, about 5 μm to about 40 μm, about 5 μm to about 35 μm, about 5 μm to about 30 μm, about 5 μm to about 25 μm, about 5 μm to about 20 μm, about 5 μm to about 15 μm, or about 5 μm to about 10 μm. For example, the particle sugar may have a particle size D50 of about 10 μm to about 50 μm, about 10 μm to about 45 μm, about 10 μm to about 40 μm, about 10 μm to about 35 μm, about 10 μm to about 30 μm, about 10 μm to about 25 μm, about 10 μm to about 20 μm, or about 10 μm to about 15 μm. For example, the particle sugar may have a particle size D50 of about 15 μm to about 50 μm, about 15 μm to about 45 μm, about 15 μm to about 40 μm, about 15 μm to about 35 μm, about 15 μm to about 30 μm, about 15 μm to about 25 μm, or about 15 μm to about 20 μm. For example, the particle sugar may have a particle size D50 of about 20 μm to about 50 μm, about 20 μm to about 45 μm, about 20 μm to about 40 μm, about 20 μm to about 35 μm, about 20 μm to about 30 μm, or about 20 μm to about 25 μm.

For example, the particle sugar may have a particle size D50 of about 25 μm to about 50 μm, about 25 μm to about 45 μm, about 25 μm to about 40 μm, about 25 μm to about 35 μm, or about 25 μm to about 30 μm. For example, the particle sugar may have a particle size D50 of about 30 μm to about 50 μm, about 30 μm to about 45 μm, about 30 μm to about 40 μm, or about 30 μm to about 35 μm. For example, the particle sugar may have a particle size D50 of about 35 μm to about 50 μm, about 35 μm to about 45 μm, or about 35 μm to about 40 μm. For example, the particle sugar may have a particle size D50 of about 40 μm to about 50 μm, or about 40 μm to about 45 μm. For example, the particle sugar may have a particle size D50 of about 45 μm to about 50 μm.

Preferably, the particle sugar has a particle size D50 of about 10 μm to about 40 μm, more preferably about 15 μm to about 36 μm.

In a preferred embodiment of the present invention, the particle sugar has a particle size D90 of less than or equal to about 600 μm, preferably less than or equal to about 450 μm, preferably less than or equal to about 100 μm, and more preferably less than or equal to about 150 μm.

The particle sugar preferably has a particle size D90 of about 40 μm to about 150 μm, about 50 μm to about 140 μm, about 60 μm to about 130 μm, about 70 μm to about 120 μm, or about 80 μm to about 110 μm.

In a preferred embodiment of the present invention, the particle sugar preferably has a particle size D90 of greater than or equal to about 40 μm, more preferably greater than or equal to about 50 μm, more preferably greater than or equal to about 60 μm, more preferably greater than or equal to about 70 μm, and more preferably greater than or equal to about 80 μm.

Preferably, the particle sugar has a particle size D90 of about 40 μm to about 140 μm, more preferably about 50 μm to about 130 μm, particularly preferably about 55 μm to about 125 μm, even more preferably about 60 μm to about 120 μm, and most preferably about 90 μm to about 110 μm.

Without being bound by theory, it is hypothesised that the technical effect of the smaller sugar particle size is to promote full dissolution of the sugar in the low amount of water present in the dough. If the sugar particle size is too high then not all of the sugar can dissolve, resulting in the formation of crystallisation nucleation sites from the not fully dissolved sugar particles. Sugar crystallisation is promoted at these sites. As the sugar recrystallises it releases water, which is subsequently lost across a diffusion gradient with the external surface of the cookie upon baking. This results in a loss of texture differentiation that is unappealing to the consumer. It is considered that the above ranges of D90 support this technical effect.

The particle sugar may have a particle size D98 of about 15 µm to about 150 µm, preferably about 20 µm to about 120 µm, more preferably about 50 µm to about 130 µm, most preferably about 70 µm to about 120 µm.

In a preferred embodiment, the particle sugar in the cookie precursor has a D10 of about 2.0 µm to about 7.5 µm, a D50 of about 10 µm to about 40 µm and a D90 of about 50 µm to about 130 µm. In a more preferred embodiment, the cookie precursor has a D10 of about 2.5 µm to about 5 µm, a D50 of about 15 µm to about 36 µm and a D90 of about 90 µm to about 120 µm.

In a more preferred embodiment, the cookie precursor comprises about 5 wt % to about 35 wt %, preferably about 7.5 wt % to about 30 wt % particle sugar relative to the weight of the dough, wherein the particle sugar has a particle size D90 of about 50 µm to about 130 µm.

In the most preferred embodiment, the cookie precursor comprises about 10 wt % to about 28 wt %, preferably about 15 wt % to about 25 wt %, most preferably about 18 wt % to 24 wt % particle sugar relative to the weight of the dough, wherein the particle sugar has a particle size D90 of about 90 µm to about 120 µm.

Sugar Syrup

As mentioned above, in addition to the particle sugar the cookie precursor also contains a sugar syrup. As used herein, the phrase 'sugar syrup' is defined as a sugar water solution containing at least a natural sugar and water, more specifically a solution of sugar in water containing a large amount of dissolved sugars but with minimal tendency to deposit crystals i.e. the sugar syrup is substantially free from sugar crystals as measured using the particle size and particle size distributions methods disclosed above, laser light diffraction for example.

In a preferred embodiment the sugar syrup contains less than 5 wt % sugar crystals, less than 4 wt %, preferably less than 3 wt %, less than 2 wt % or most preferably less than 1 wt % sugar crystals. In the most preferred embodiment the sugar syrup is substantially free from sugar crystals.

The dry matter content of sugar syrup is typically given in weight per 100 g of sugar syrup. As used herein, the sugar syrup has a dry matter content of about 20 g/100 g to about 90 g/100 g, preferably about 50 g/100 g to about 90 g/100 g, more preferably about 60 g/100 g to about 90 g/100 g, most preferably about 70 g/100 g to about 80 g/100 g.

The sugar syrup may comprise invert syrup, fructose syrup, high fructose syrup, corn syrup, high fructose corn syrup, glucose syrup, glucose-fructose syrup, fructose-glucose syrup, isoglucose or dextrose syrup.

An invert syrup as used above is defined as a syrup mixture of the monosaccharides glucose (dextrose) and fructose that are typically made by hydrolytic saccharification of the disaccharide sucrose.

Glucose syrups as used above are well known in the art and are obtained by hydrolysis of starches, generally vegetable starches. They may have a variable composition but are generally classified on the basis of their dextrose equivalence (DE) value. Generally, glucose syrups have a DE value greater than 20, with a higher DE value meaning more starch has been hydrolysed. Glucose syrup can refer to any liquid starch hydrolysate of mono-, di-, and higher-saccharides and can be made from any source of starch, such as wheat, tapioca, rice, potatoes or corn (maize). Fructose syrup, high fructose syrup, high fructose corn syrup, glucose-fructose syrup and fructose-glucose syrup can be produced as described for glucose syrup, whereby starch is broken down into glucose by hydrolysis. To increase the fructose content, the syrup is further processed by enzymes such as isomerases to convert the glucose into fructose. The most common fructose syrups have a 42% or 55% fructose content.

Isoglucose syrup as used above is defined as a syrup prepared from glucose (corn) syrups, when a part of the glucose is converted into fructose by enzymatic isomerization. In the EU, syrups of 10% fructose content or more carry the name isoglucose syrups as defined by the Council Regulation (EC) No 1234/2007 of 22 Oct. 2007.

In a preferred embodiment, the sugar syrup comprises fructose syrup, high fructose syrup, glucose-fructose syrup, fructose-glucose syrup, isoglucose or dextrose syrup.

In a particularly preferred embodiment, the sugar syrup comprises fructose syrup, glucose-fructose syrup, a fructose-glucose syrup or isoglucose.

In the most preferred embodiment, the sugar syrup comprises a fructose syrup with a 55% fructose content.

In a preferred embodiment, sugar syrup embodiments below relate to the first dough, i.e. preferably the inner dough, i.e. for certainty, not the total sugar syrup content of the entire cookie precursor but the sugar syrup content of the first dough only.

In a particular embodiment, the cookie precursor comprises about 5 to about 30 wt % sugar syrup relative to the total weight of the dough.

For example, the cookie precursor may comprise about 5 wt % to about 27 wt %, about 5 wt % to about 25 wt %, about 5 wt % to about 23 wt %, about 5 wt % to about 20 wt %, or about 5 wt % to about 17 wt % sugar syrup relative to the total weight of the dough. For example, the cookie precursor may comprise about 6 wt % to about 27 wt %, about 6 wt % to about 25 wt %, about 6 wt % to about 23 wt %, about 6 wt % to about 20 wt %, or about 6 wt % to about 17 wt % sugar syrup relative to the total weight of the dough. In a particular embodiment, the cookie precursor comprises about 7 to about 30 wt % sugar syrup relative to the total weight of the dough.

For example, the cookie precursor may comprise about 7 wt % to about 27 wt %, about 7 wt % to about 25 wt %, about 7 wt % to about 23 wt %, about 7 wt % to about 20 wt %, or about 7 wt % to about 17 wt % sugar syrup relative to the total weight of the dough. For example, the cookie precursor may comprise about 6 wt %, about 8 wt %, about 10 wt %, about 12 wt %, about 14 wt %, about 15 wt %, or about 16 wt % sugar syrup relative to the total weight of the dough.

Preferably, the cookie precursor comprises about 5 wt % to about 20 wt %, more preferably about 6 wt % to about 18 wt %, most preferably about 7 wt % to about 16 wt %, sugar syrup relative to the total weight of the dough.

If the amount of sugar syrup falls outside of the ranges above, when the cookie precursors are baked the cookies do not have the desired textures when consumed. Using sugar syrup in excess of the ranges disclosed results in cookies that are soft and do not have a crisp outer. If too little sugar syrup is used then the inner part of the cookie does not remain chewy and doughy after 2 weeks of storage under appropriate conditions as described above.

In an embodiment, the cookie precursor contains molasses. Molasses are not considered to be a sugar syrup within the meaning of the present invention and if present in the cookie precursor, will be considered as an additional ingredient. For example, the cookie precursor may comprise between 0 and 10 wt % molasses, preferably between 0 and 8 wt %, more preferably between 0 and 6 wt %, most preferably between 0 and 5 wt % relative to the weight of the dough. In a preferred embodiment, the molasses content embodiments above relate to both the first dough and the second dough In a preferred embodiment, the first and second doughs contain molasses, preferably in an amount of between 1 and 8 wt %.

Sugar Alcohol

As mentioned above, in addition to the particle sugar and sugar syrup, the cookie precursor also comprises a sugar alcohol. As used herein, sugar alcohols are preferably defined as organic compounds, typically derived from sugars, containing one hydroxyl group attached to each carbon atom. Other names in the field of food chemistry for these compounds are polyols, polyhydric alcohols, polyalcohols, alditols or glycitois.

In a preferred embodiment, the sugar alcohol is selected from the group consisting of sorbitol, mannitol, isomalt, maltitol, lactitol, xylitol, erythritol or glycerol or mixtures thereof. In a particularly preferred embodiment, the sugar alcohol is selected from the group consisting of maltitol, erythritol or glycerol, or mixtures thereof. In the most preferred embodiment, the sugar alcohol is glycerol.

In a preferred embodiment, sugar alcohol content embodiments below relate to the first dough, i.e. preferably the inner dough, i.e. for certainty, not the total sugar alcohol content of the entire cookie precursor but the sugar alcohol content of the first dough only.

In a particular embodiment, the cookie precursor comprises about 2.5 to about 25 wt % sugar alcohol relative to the total weight of the dough.

For example, the cookie precursor may comprise about 3 wt % to about 25 wt %, about 3 wt % to about 21 wt %, about 3 wt % to about 18 wt %, about 3 wt % to about 15 wt %, or about 3 wt % to about 13 wt % sugar alcohol relative to the total weight of the dough. In a particular embodiment, the cookie precursor comprises about 3.5 to about 22 wt % sugar alcohol relative to the total weight of the dough. For example, the cookie precursor may comprise about 4 wt % to about 21 wt %, about 4 wt % to about 18 wt %, about 4 wt % to about 15 wt %, or about 4 wt % to about 13 wt % sugar alcohol relative to the total weight of the dough. For example, the cookie precursor may comprise about 3 wt %, about 5 wt %, about 6 wt %, about 8 wt %, about 10 wt %, about 12 wt %, or about 14 wt % sugar alcohol relative to the total weight of the dough.

Preferably, the cookie precursor comprises about 2.5 wt % to about 17 wt %, more preferably about 3 wt % to about 15 wt %, most preferably about 4 wt % to about 12 wt %, sugar alcohol relative to the total weight of the dough.

If the amount of sugar alcohol falls outside of the ranges above, when the cookie precursors are baked the cookies do not have the desired textures when consumed. Using sugar alcohol in excess of the ranges disclosed results in cookies that are dry and crumbly. If too little sugar alcohol is used then the inner part of the cookie does not remain chewy and doughy after 2 weeks of storage under appropriate conditions as described above.

Dry Weight Ratio of Particle Sugar to Sugar in the Sugar Syrup

As used herein, the term 'dry weight'" is defined as the weight of solids remaining after substantially all moisture has been removed, for example, less than 1 wt % water, preferably less than 0.5 wt % water, most preferably less than 0.1 wt % water, relative to the total weight of the sample.

As mentioned above, the cookie precursor comprises particle sugar and sugar syrup, wherein the dry weight ratio of particle sugar to sugar in the sugar syrup is 4.75 or below.

In a particular embodiment, the dry weight ratio of particle sugar to sugar in the sugar syrup is between 0.25 and 4.75.

For example, the dry weight ratio of particle sugar to sugar in the sugar syrup is between 0.5 and 4.75, between 0.75 and 4.75, between 1.25 and 4.75 or between 1.5 and 4.75. For example, the dry weight ratio of particle sugar to sugar in the sugar syrup is between 0.5 and 4.25, between 0.75 and 4.25, between 1.25 and 4.25 or between 1.5 and 4.25. For example, the dry weight ratio of particle sugar to sugar in the sugar syrup is between 0.5 and 4, between 0.75 and 4, between 1.25 and 4 or between 1.5 and 4.

In a preferred embodiment, the dry weight ratio of particle sugar to sugar in the sugar syrup is between 0.75 and 3.75.

For example, the dry weight ratio of particle sugar to sugar in the sugar syrup is between 1 and 3.75, between 1.25 and 3.75 or between 1.5 and 3.75. For example, the dry weight ratio of particle sugar to sugar in the sugar syrup is between 1 and 3.25, between 1.25 and 3.25 or between 1.5 and 3.25. In a particular embodiment, the dry weight ratio of particle sugar to sugar in the sugar syrup is between 1 and 3.

In a preferred embodiment, the dry weight ratio of particle sugar to sugar in the sugar syrup is between 1.15 and 3, between 1.25 and 3, between 1.35 and 3 or between 1.5 and 3. In a more preferred embodiment, the dry weight ratio of particle sugar to sugar in the sugar syrup is between 1.5 and 2.75. In the most preferred embodiment, the dry weight ratio of particle sugar to sugar in the sugar syrup is between 1.6 and 2.75.

In a preferred embodiment, the dry weight ratio of particle sugar to sugar in the sugar syrup is between 1.25 and 2.75 and the particle sugar has a particle size D90 of about 50 μm to about 130 μm.

In the most preferred embodiment, the dry weight ratio of particle sugar to sugar in the sugar syrup is between 1.5 and 2.75 and the particle sugar has a particle size D90 of about 90 μm to about 120 μm.

In a preferred embodiment, the cookie precursor comprises about 6 wt % to about 18 wt % sugar syrup relative to the total weight of the dough, has a dry weight ratio of particle sugar to sugar in the sugar syrup between 1.25 and 2.75 and the particle sugar has a particle size D90 of about 50 μm to about 130 μm.

In the most preferred embodiment, the cookie precursor comprises about 7 wt % to about 16 wt % sugar syrup relative to the total weight of the dough, has a dry weight ratio of particle sugar to sugar in the sugar syrup between 1.5 and 2.75 and the particle sugar has a particle size D90 of about 90 μm to about 120 μm.

Using a dry weight ratio in the preferred range above allows the production of a cookie with a soft and chewy inner that persists after 2 weeks when stored appropriately as described above. Using a dry weight ratio outside of the ranges disclosed above resulted in cookies that were dry and crumbly after baking and did not have the freshly baked dual texture after storage under appropriate conditions as described above.

Weight Ratio of Particle Sugar to Sugar Alcohol

As mentioned above, the cookie precursor comprises particle sugar and sugar alcohol, wherein the weight ratio of particle sugar to sugar alcohol is 4.6 or below.

In a particular embodiment, the weight ratio of particle sugar to sugar alcohol is between 0.25 and 4.6.

For example, the weight ratio of particle sugar to sugar alcohol is between 0.25 and 4.5, between 0.75 and 4.5, between 1.25 and 4.5 or between 1.5 and 4.5. For example, the weight ratio of particle sugar to sugar alcohol is between 0.25 and 4.4, between 0.75 and 4.4, between 1.25 and 4.4 or between 1.5 and 4.4. In a particular embodiment, the weight ratio of particle sugar to sugar alcohol is between 0.75 and 4.3. For example, the weight ratio of particle sugar to sugar alcohol is between 0.75 and 4.25, between 0.95 and 4.25, between 1.25 and 4.25 or between 1.5 and 4.25.

In a preferred embodiment, the weight ratio of particle sugar to sugar alcohol is between 0.75 and 4.15, between 0.95 and 4.15, between 1.25 and 4.15 or between 1.5 and 4.15. In a more preferred embodiment, the weight ratio of particle sugar to sugar alcohol is between 1.75 and 4.1. In the most preferred embodiment, the weight ratio of particle sugar to sugar alcohol is between 1.85 and 4.

In a preferred embodiment, the weight ratio of particle sugar to sugar alcohol is between 1.75 and 4.1 and the particle sugar has a particle size D90 of about 50 μm to about 130 μm.

In the most preferred embodiment, the weight ratio of particle sugar to sugar alcohol is between 1.85 and 4 and the particle sugar has a particle size D90 of about 90 μm to about 120 μm.

In a preferred embodiment, the cookie precursor comprises about 3 wt % to about 15 wt % sugar alcohol relative to the total weight of the dough, has a weight ratio of particle sugar to sugar alcohol between 1.75 and 4.1 and the particle sugar has a particle size D90 of about 50 μm to about 130 μm.

In the most preferred embodiment, the cookie precursor comprises about 4 wt % to about 12 wt % sugar alcohol relative to the total weight of the dough, has a weight ratio of particle sugar to sugar alcohol between 1.85 and 4 and the particle sugar has a particle size D90 of about 90 μm to about 120 μm.

Using a weight ratio in the preferred range above allows the production of a cookie with a soft and chewy inner that persists after 2 weeks when stored appropriately as described above. Using a weight ratio outside of the ranges disclosed above resulted in cookies did not maintain the freshly baked dual texture after storage under appropriate conditions as described above.

Second Dough

In an embodiment, the cookie precursor comprises a first dough and a second dough.

In a particular embodiment the ratio by weight of the first dough to the second dough is from 10:90 to 60:40, prefer-ably from 20:80 to 50:50, more preferably from 25:75 to 45:55, most preferably from 30:70 to 40:60.

For example, the ratio by weight of the first dough to the second dough is about 10:90, about 15:85, about 20:80, about 25:75, about 30:70, about 35:65, about 40:60, about 45:55, about 50:50, about 55:45 or about 60:40.

In a particularly preferred embodiment, the ratio by weight of the first dough to the second dough is from about 32:68 to 40:60, from about 33:67 to 39:61, preferably from about 34:66 to 38:62, more preferably from about 35:65 to 37:63 and most preferably 36:64. In a preferred embodi-ment, the second dough contains particle sugar.

For example, the second dough may comprise about 10 wt % to about 50 wt % particle sugar relative to the total weight of the second dough. For example, the second dough may comprise about 15 wt % to about 45 wt %, about 15 wt % to about 40 wt %, about 15 wt % to about 35 wt % or about 15 wt % to about 30 wt % particle sugar relative to the total weight of the dough. For example, the second dough may comprise about 17.5 wt % to about 45 wt %, about 17.5 wt % to about 40 wt %, about 17.5 wt % to about 35 wt % or about 17.5 wt % to about 30 wt % particle sugar relative to the total weight of the dough. For example, the second dough may comprise about 20 wt % to about 45 wt %, about 20 wt % to about 40 wt %, about 20 wt % to about 35 wt % or about 20 wt % to about 30 wt % particle sugar relative to the total weight of the dough. For example, the second dough may comprise about 18 wt %, about 20 wt %, about 22 wt %, about 23 wt %, about 25 wt %, about 30 wt %, about 32 wt %, about 34 wt %, about 36 wt %, about 38 wt % or about 40 wt % particle sugar relative to the total weight of the dough.

Preferably, the second dough comprises about 10 wt % to about 40 wt %, more preferably about 15 wt % to about 35 wt %, more preferably about 25 wt % to about 35 wt %, most preferably about 28 wt % to about 33 wt %, particle sugar relative to the total weight of the dough.

In an embodiment, the second dough contains particle sugar with a particle size D90 of about 40 μm to about 140 μm, about 50 μm to about 130 μm, about 55 μm to about 125 μm, about 60 μm to about 120 μm or about 90 μm to about 110 μm.

In a particular embodiment, the second dough contains particle sugar with a particle size D90 of about 150 μm to about 1250 μm.

For example, the particle sugar in the second dough may have a particle size D90 of about 250 μm to about 1250 μm, about 350 μm to about 1250 μm, about 450 μm to about 1250 μm, about 650 μm to about 1250 μm, about 750 μm to about 1250 μm, about 850 μm to about 1250 μm, or about 950 μm to about 1250 μm. For example, the particle sugar in the second dough may have a particle size D90 of about 350 μm to about 1100 μm, about 450 μm to about 1100 μm, about 550 μm to about 1100 μm, about 650 μm to about 1100 μm, about 750 μm to about 1100 μm or about 850 μm to about 1100 μm. In an embodiment, the particle sugar in the second dough may have a particle size D90 of about 400 μm to about 1050 μm.

Preferably, the particle sugar in the second dough has a particle size D90 of about 450 μm to about 1050 μm, more preferably about 650 μm to about 1050 μm, even more preferably about 750 μm to about 1050 μm and most preferably about 950 μm to about 1050 μm.

Added Fat

In a particular embodiment, the cookie precursor comprises at least one added fat.

It should be understood that the cookie precursor comprises a dough, but also other ingredients that do not contribute to the weight of the dough, such as inclusions.

The term "added fat" refers to fat that is not inherently present in the other ingredients of the cookie precursor or dough, such as the flour.

Preferably, the added fat is selected from the group consisting of soybean oil; palm fat, such as palm oil or palm stearin; butter; margarine; vegetable oil, such as sunflower oil, soybean oil, rapeseed oil or peanut oil; hydrogenated oil; interesterified fat; and combinations thereof.

Preferably, the added fat is solid at room temperature. More preferably, the added fat includes palm fat.

The cookie precursor may contain about 10 wt % to about 40 wt % added fat relative to the total weight of the dough.

For example, the cookie precursor may contain about 10 wt % to about 35 wt %, about 10 wt % to about 30 wt %, about 10 wt % to about 25 wt %, about 10 wt % to about 20 wt %, about 10 wt % to about 15 wt %, or about 10 wt % added fat relative to the total weight of the dough.

For example, the cookie precursor may contain about 15 wt % to about 35 wt %, about 15 wt % to about 30 wt %, about 15 wt % to about 25 wt % or about 15 wt % to about 20 wt % added fat relative to the total weight of the dough.

For example, the cookie precursor may contain about 20 wt % to about 35 wt %, about 20 wt % to about 30 wt % or about 20 wt % to about 25 wt % added fat relative to the total weight of the dough.

For example, the cookie precursor may contain about 10 wt %, about 15 wt %, about 20 wt %, about 25 wt %, about 27 wt %, about 30 wt %, about 33 wt %, about 35 wt % or about 40 wt % added fat relative to the total weight of the dough.

Preferably, the cookie precursor contains about 15 wt % to about 37 wt %, more preferably about 20 wt % to about 35 wt %, even more preferably about 25 wt % to about 33 wt % and most preferably about 28 wt % to about 32 wt % added fat relative to the total weight of the dough.

In a preferred embodiment, the second dough contains added fat.

In a more preferred embodiment, the second dough contains less added fat than the first dough.

For example, the second dough may contain about 5 wt % to about 25 wt % added fat relative to the total weight of the second dough.

For example, the second dough may contain about 7 wt % to about 25 wt %, about 7 wt % to about 23 wt %, about 7 wt % to about 21 wt %, about 7 wt % to about 18 wt %, about 7 wt % to about 15 wt %, about 7 wt % to about 12 wt % or about 7 wt % to about 9 wt % added fat relative to the total weight of the second dough.

In a particular embodiment, the second dough may contain about 10 wt % to about 20 wt % added fat relative to the total weight of the second dough.

For example, the second dough may contain about 12 wt % to about 20 wt %, about 12 wt % to about 18 wt %, about 12 wt % to about 16 wt % or about 12 wt % to about 14 wt % added fat relative to the total weight of the second dough.

For example, the second dough may contain about 14 wt % to about 20 wt %, about 14 wt % to about 18 wt % or about 14 wt % to about 16 wt % added fat relative to the total weight of the second dough.

For example, the second dough may contain about 5 wt %, about 7 wt %, about 9 wt %, about 11 wt %, about 13 wt %, about 15 wt %, about 17 wt %, about 19 wt %, about 22 wt % or about 25 wt % added fat relative to the total weight of the second dough.

Preferably, the second dough contains about 7 wt % to about 22 wt %, more preferably about 11 wt % to about 20 wt %, and most preferably about 12 wt % to about 18 wt % added fat relative to the total weight of the second dough.

In a preferred embodiment, the cookie precursor comprises about 25 wt % to about 33 wt % added fat relative to the total weight of the dough, about 6 wt % to about 18 wt % sugar syrup relative to the total weight of the dough, about 3 wt % to about 15 wt % sugar alcohol relative to the total weight of the dough, has a dry weight ratio of particle sugar to sugar in the sugar syrup between 1.25 and 2.75, has a weight ratio of particle sugar to sugar alcohol between 1.75 and 4.1 and the particle sugar has a particle size D90 of about 50 μm to about 130 μm.

In a preferred embodiment, the cookie precursor comprises about 28 wt % to about 32 wt % added fat relative to the total weight of the dough, about 7 wt % to about 16 wt % sugar syrup relative to the total weight of the dough, about 4 wt % to about 12 wt % sugar alcohol relative to the total weight of the dough, has a dry weight ratio of particle sugar to sugar in the sugar syrup between 1.5 and 2.75, has a weight ratio of particle sugar to sugar alcohol between 1.85 and 4 and the particle sugar has a particle size D90 of about 90 μm to about 120 μm.

In a particularly preferred embodiment, the cookie precursor comprises a first and a second dough, wherein the ratio by weight of the first dough to the second dough is from about 34:66 to 38:62, wherein the second dough contains about 11 wt % to about 20 wt % added fat relative to the total weight of the second dough, about 25 wt % to about 35 wt % particle sugar relative to the total weight of the dough, wherein the particle sugar in the second dough has a particle size D90 of about 750 μm to about 1050 μm.

In the most preferred embodiment, the cookie precursor comprises a first and a second dough, wherein the ratio by weight of the first dough to the second dough is from about 35:65 to 37:63, wherein the second dough contains about 12 wt % to about 18 wt % added fat relative to the total weight of the second dough, about 28 wt % to about 33 wt % particle sugar relative to the total weight of the dough, wherein the particle sugar in the second dough has a particle size D90 of about 950 μm to about 1050 μm.

To further improve the processability of the cookie precursor and the textures of the cookie once baked, the optimised ranges of fat as disclosed above can be used. Using added fat in excess of the ranges disclosed can result in cookies that exhibit oiling out or have undesirable spreading during baking resulting in thin, crispy cookies. If too little added fat is used, then the cookie precursors can become more difficult to process and the cookies when baked are drier and crumblier.

Flour

In a particular embodiment, the cookie precursor comprises flour.

The cookie precursor may contain about 5 wt % to about 35 wt % flour relative to the total weight of the dough.

For example, the cookie precursor may contain about 5 wt % to about 30 wt %, about 5 wt % to about 25 wt %, about 5 wt % to about 23 wt % or about 5 wt % to about 22 wt % flour relative to the total weight of the dough.

For example, the cookie precursor may contain about 10 wt % to about 30 wt %, about 10 wt % to about 25 wt %, about 10 wt % to about 23 wt % or about 10 wt % to about 22 wt % flour relative to the total weight of the dough.

In a particular embodiment the cookie precursor may contain about 13 wt % to about 30 wt % flour relative to the total weight of the dough.

For example, the cookie precursor may contain about 15 wt % to about 30 wt %, about 15 wt % to about 25 wt %, about 15 wt % to about 23 wt % or about 15 wt % to about 22 wt % flour relative to the total weight of the dough.

In a particular embodiment, the cookie precursor may contain about 17 wt % to about 27 wt % flour relative to the total weight of the dough.

For example, the cookie precursor may contain about 18 wt % to about 27 wt %, about 18 wt % to about 25 wt %, about 18 wt % to about 23 wt % or about 18 wt % to about 22 wt % flour relative to the total weight of the dough.

For example, the cookie precursor may contain about 5 wt %, about 8 wt %, about 11 wt %, about 14 wt %, about 17 wt %, about 20 wt %, about 23 wt %, about 26 wt %, about 29 wt %, about 32 wt % or about 35 wt % flour relative to the total weight of the dough.

Preferably, the cookie precursor contains about 17 wt % to about 27 wt %, more preferably about 18 wt % to about 25 wt %, and most preferably about 18 wt % to about 22wt % flour relative to the total weight of the dough.

In a preferred embodiment, the above ranges relate to flour content of the first dough, i.e. preferably the inner dough, i.e. for certainty, not the total flour content of the entire cookie precursor but the flour content of the first dough only.

The flour may comprise wheat flour and/or comprise flour from non-wheat grains, optionally in one embodiment to replace the wheat flour, alternatively in another embodiment in addition to the wheat flour.

In a preferred embodiment, the flour consists essentially of wheat flour. The wheat flour may be soft or hard wheat flour. Any wheat flour or non-wheat flour present may be whole grain.

The term "whole grain" refers to a grain of any cereal or pseudo-cereal that contains the endosperm, germ, and bran, in contrast to refined grains, which retain only the endosperm The term "soft flour" refers to flour that has a low protein content, preferably having a protein content of less than about 11%, more preferably less than about 10%, most preferably less than about 9%, by weight of total weight of flour. Usefully the protein content of soft flour is at least about 5%, more usefully at least about 6%, most usefully at least about 7% by weight of total weight of flour. Conveniently, soft flour has a protein content from about 5% up to about 11%, more conveniently from about 6% to about 10%, most conveniently from about 7% to about 9% by weight of total weight of flour.

The term "hard flour" refers to flour that has a high protein content, preferably having a protein content of more than about 11%, more preferably at least about 12%, most preferably at least about 13%, for example at least about 14% by total weight of flour. Usefully the protein content of hard flour is no more than about 20%, usefully no more than about 17%, more usefully no more than about 15% by total weight of flour. Conveniently, hard flour has a protein content from about 11% to about 20%, more conveniently from about 12% to about 17%, most conveniently from about 13% to about 15% by total weight of flour.

In the most preferred embodiment, the flour consists essentially of soft wheat flour.

The flour may comprise a non-wheat flour instead of or in additional to the wheat flour. More conveniently, the non-wheat flour is obtained and/or obtainable from one or more of the following sources of grain: non-wheat cereals such as rye, common oat (Avena sativa, also referred to herein as oats), rice and/or bran; legumes such as beans and/or soybeans; and/or suitable mixtures thereof.

Non-wheat food grade crops (such as cereal grains) that are suitable for producing flours for use in the present invention are selected from the group consisting of: warm season cereals (such as maize kernels; finger millet; fonio; foxtail millet; Kodo millet; Japanese millet; Job's Tears; maize (corn); pearl millet; proso millet; and/or sorghum); cool season non wheat cereals (such as barley, oats, rice, rye, teff, triticale and/or, wild rice); pseudo cereal grains; (such as starchy grains from broadleaf plant families: amaranth buckwheat, smartweed and/or quinoa); grain legumes and/or pulses (such as lentil, pea, chickpeas, common beans, fava beans, garden peas, lentils, lima beans, lupins, mung beans, peas, peanuts, pigeon peas, runner beans and/or, soybeans), cassava (Maihot esculenta) and/or any suitable combinations and/or mixtures thereof.

Cassava is an important subsistence crop in many tropical areas including, for example, Asia, Africa and Latin America. The cassava roots are a major source of carbohydrates such as starch. This starch from the cassava root can be extracted to produce cassava starch also known as tapioca starch or tapioca flour. Cassava flour is made by cooking, drying and grinding cassava root to a fine powder. This is different from cassava starch, which is made from the starch of the cassava plant whereas the cassava flour is made from the ground root. Both tapioca flour and cassava flour can be used in the present invention. Flour from yucca may also be used.

Preferred non-wheat flours are those obtained and/or obtainable from millet; maize, barley, oats, rice, rye and/or soybeans. More preferred non-wheat flours are those obtained and/or obtainable from barley, oats, rice and/or rye, most preferred non-wheat flours are those obtained from rye and/or oats, such as from oats. An example of oats as used herein is the common oat (Avena sativa).

The non-wheat flour where present may be present in an amount of at least about 0.5%, preferably in an amount of at least about 5% by weight, conveniently at least about 6%, more conveniently at least about 8%, even more conveniently at least about 10%, most conveniently at least about 15%, for example at least about 20% of the total flour.

Advantageously in this embodiment the non-wheat flour may be present in an amount of about 100%, less than or equal to about 75%, less than or equal to about 50%, more advantageously less than or equal to about 40%, most advantageously less than or equal about 30%, for example less than or equal about 25% of the total flour. Preferably in this embodiment the non-wheat flour may be present in the baked product in an amount of from about 0.5% to about 50%, preferably from about 5 to about 50%, more preferably from about 6 to about 40%, most preferably from about 8 to about 30%, for example from about 10 to about 25% of the total flour.

The above percentages preferably relate to the total non-wheat flours, not each individual non-wheat flours if a combination is present.

In a preferred embodiment, the second dough contains a larger amount of flour than the first dough.

For example, the second dough comprises at least 20 wt % flour, and preferably at least 25 wt % flour. For example, the second dough comprises between 20 wt % and 50 wt % flour relative to the total weight of the dough. For example, the second dough may contain about 23 wt % to about 50 wt %, about 26 wt % to about 50 wt %, about 29 wt % to about 50 wt %, about 32 wt % to about 50 wt %, about 35 wt % to about 50 wt %, about 38 wt % to about 50 wt %, about 41 wt % to about 50 wt %, about 44 wt % to about 50 wt % or about 47 wt % added fat relative to the total weight of the dough. For example, the second dough may contain about 23 wt % to about 45 wt %, about 26 wt % to about 45 wt %, about 29 wt % to about 45 wt %, about 32 wt % to about 45 wt %, about 35 wt % to about 45 wt %, about 38 wt % to about 45 wt % or about 41 wt % to about 45 wt % flour relative to the total weight of the dough. For example, the second dough may contain about 20 wt %, about 22 wt %, about 24 wt %, about 26 wt %, about 28 wt %, about 30 wt %, about 32 wt %, about 34 wt %, about 36 wt %, about 38 wt %, about 40 wt %, about 42 wt %, about 44 wt %, about 46 wt %, about 48 wt % or about 50 wt % flour relative to the total weight of the dough.

In a particular embodiment, the second dough contains about 25 wt % to about 47 wt %, about 27 wt % to about 45 wt %, or about 27 wt % to about 43 wt %, flour relative to the total weight of the dough.

Preferably, the second dough contains about 30 wt % to about 43 wt %, more preferably about 33 wt % to about 43 wt %, and most preferably about 36 wt % to about 40 wt % flour relative to the total weight of the dough.

In a particularly preferred embodiment, the ratio by weight of the first dough to the second dough is from about 34:66 to 38:62, wherein the second dough contains about 33 wt % to about 43 wt % flour relative to the total weight of the second dough, about 11 wt % to about 20 wt % added fat relative to the total weight of the second dough, about 25 wt % to about 35 wt % particle sugar relative to the total weight of the dough, wherein the particle sugar in the second dough has a particle size D90 of about 750 μm to about 1050 μm.

In the most preferred embodiment, the ratio by weight of the first dough to the second dough is from about 35:65 to 37:63, wherein the second dough contains about 36 wt % to about 40 wt % flour relative to the total weight of the second dough, about 12 wt % to about 18 wt % added fat relative to the total weight of the second dough, about 28 wt % to about 33 wt % particle sugar relative to the total weight of the dough, wherein the particle sugar in the second dough has a particle size D90 of about 950 μm to about 1050 μm.

To further improve the processability of the cookie precursor and the textures of the cookie once baked, the optimised ranges of flour as disclosed above can be used. If the amount of flour falls outside of the ranges above, when the cookie precursors are baked the cookies may not have optimal textures when consumed. Using flour in excess of the ranges disclosed can result in cookies that are drier, crumblier, have a more cake-like texture and may have issues in processability. If too little flour is used, then the cookie precursors may become harder when baked or become thinner and crispier.

Added Water

In a preferred embodiment, the first dough contains no added water and the second dough contains added water. The term "added water" refers to water that is not inherently present in the other ingredients of the dough or baked product, such as the flour.

In other embodiments, the second dough does not contain added water. However, the most preferred embodiment includes added water.

The second dough may contain about 1 wt % to about 20 wt % added water relative to the total weight of the second dough.

For example, the second dough may contain about 1 wt % to about 15 wt %, about 1 wt % to about 10 wt %, about 1 wt % to about 9 wt %, about 1 wt % to about 8 wt %, about 1 wt % to about 7 wt %, or about 1 wt % to about 6 wt %, added water relative to the total weight of the second dough. For example, the second dough may contain about 4 wt % to about 20 wt %, about 4 wt % to about 15 wt %, about 4 wt % to about 10 wt %, about 4 wt % to about 8 wt %, or about 4 wt % to about 5 wt % added water relative to the total weight of the dough. For example, the dough may contain about 5 wt % to about 20 wt %, about 5 wt % to about 15 wt %, about 5 wt % to about 10 wt %, about 5 wt % to about 7 wt %, or about 5 wt % to about 8 wt % added water relative to the total weight of the second dough. For example, the second dough may contain about 8 wt % to about 20 wt %, about 8 wt % to about 15 wt %, or about 8 wt % to about 10 wt % added water relative to the total weight of the second dough. For example, the second dough may contain about 10 wt % to about 20 wt %, or about 10 wt % to about 15 wt % added water relative to the total weight of the second dough. For example, the second dough may contain about 15 wt % to about 20 wt % added water relative to the total weight of the second dough.

For example, the second dough may contain about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt % or about 20 wt % added water relative to the total weight of the second dough.

Preferably, the second dough contains about 5 wt % to about 15 wt %, preferably about 5 wt % to about 10 wt %, added water relative to the total weight of the second dough.

Leavening Agent

In an embodiment, the cookie precursor comprises a leavening agent. Preferably, the leavening agent is a chemical leavening agent.

The terms "leavening agent" or "raising agent" have their standard meanings in the art, i.e. a substance that is used in dough to enable the dough to rise, particularly during the baking process.

The leavening agent may be selected from the group consisting of sodium bicarbonate, sodium phosphate, ammonium bicarbonate, monocalcium phosphate, sodium acid pyrophosphate, sodium aluminium sulfate, potassium bitartrate or cream of tartar, sodium aluminium phosphate, sodium acid aluminium phosphate hydrate, glucono-delta-lactone, adipic acid, potassium bicarbonate, calcium phosphate, ammonium carbonate and combinations thereof. Preferably, the leavening agents are selected from the group consisting of sodium bicarbonate, sodium phosphate, ammonium bicarbonate, monocalcium phosphate, sodium acid pyrophosphate, sodium aluminium sulfate, potassium bitartrate, sodium aluminium phosphate, glucono-delta-lactone and adipic acid, and combinations thereof.

The leavening agents may be present in the cookie precursor in a range of about 1 wt % to about 5 wt %. Preferably, the leavening agents are present in the cookie precursor in a range of about 1 wt % to about 4 wt %, more preferably about 2 wt % to about 3 wt %, relative to the total weight of the dough.

In a preferred embodiment, the first dough is free from leavening agents and the second dough contains at least one leavening agent.

Additional Ingredients

The cookie precursor may optionally contain about 0 wt % to about 30 wt % additional ingredients, relative to the total weight of the dough.

Preferably, the cookie precursor contains about 5 wt % to about 27 wt %, more preferably about 10 wt % to about 25 wt %, even more preferably about 15 wt % to about 25 wt % additional ingredients, relative to the total weight of the dough.

Possible additional ingredients include natural or artificial flavourings (e.g. fruit flavourings), natural or artificial colorants, cocoa powder, emulsifiers (e.g. lecithin), high intensity sweetener, whole egg, sodium chloride, milk powder (whole or skimmed), soy flour, and/or mixtures thereof.

Preferably, the cookie precursor comprises about 0.05 wt % to about 2 wt %, more preferably about 0.3 wt % to about 1.5 wt %, most preferably about 0.4 wt % to about 1 wt % sodium chloride, relative to the total weight of the dough.

The cookie precursor may comprise inclusions. The inclusions may be any that are commonly used in the art, like fruit-based inclusions, chocolate chips, nut-based inclusions, cereal-based inclusions and yogurt-based inclusions, for example. The inclusions may take the form of those commonly used, for example chips, flakes, crisps/crispies etc.

In a preferred embodiment, the cookie precursor comprises at least one flavouring.

In a highly preferred embodiment, the cookie precursor comprises chocolate chips.

Typically, the amount of chocolate chips added to the cookie precursor is measured in parts per weight relative to the parts per weight of the dough.

Preferably, the cookie precursor contains about 10 to about 27 parts per weight, more preferably about 10 to about 25 parts per weight, even more preferably about 17 to about 25 parts per weight chocolate chips, based on 100 parts per weight of the dough.

In an embodiment, the cookie precursor formed from a first and second dough comprises inclusions only in the second dough.

The cookie precursor may comprise a high intensity sweetener. The high intensity sweetener may be a natural component, for example, a Luo Han Guo fruit extract (mogrosides), a steviol glycoside and combinations thereof. In an embodiment, the baked product may comprise steviol glycosides selected from rebaudioside A, B, C, D, E, M and X and stevioside and combinations thereof.

Process

The process of the invention comprises preparing a cookie precursor comprising a dough and baking the cookie precursor.

Preferably, the baked products are prepared by a process that comprises the steps of preparing the dough (i.e. mixing), shaping the dough and baking.

Preparing the Dough

The mixing step may comprise one or more stages.

Preferably, the mixing step comprises a creaming step as a first step.

The second stage may comprise dough formation. Preferably, flour and a portion of leavening agent are added to the composition produced in the first stage.

Any inclusions may be added after the formation of the dough in a second or a third step.

Preferably, forming the first dough comprises:
(i) mixing the particle sugar, added fat, one or more leavening agents, flour and remaining powder ingredients;
(ii) mixing to form a dough.
(iii) adding flavouring, sugar syrup, sugar alcohol and any remaining ingredients
(iv) mixing to incorporate into the dough
(v) add inclusions (optional)
(vi) mixing to incorporate into the dough (optional)

Preferably, the mixing in steps (i), (ii) and (iv) is carried out over a period of about 30 seconds to about 5 minutes, more preferably about 1 minutes to about 4 minutes.

Preferably, the mixing in steps (i), (ii) and (iv) is carried out in a horizontal or high shear mixer.

More preferably, the mixing in steps (i) and (ii) are carried out in a horizontal mixer over a period of about 1 minute to about 3 minutes, more preferably about 2 minutes and the mixing in step (iv) is carried out in a horizontal mixer over a period of about 1 minute to about 2 minutes, more preferably about 1 minute. The mixing in step (vi) is carried out in a horizontal mixer over a period of about 10 seconds to about 2 minutes, more preferably less than 1 minute.

Preferably, forming the second dough comprises:
(i) mixing the added fat and powder ingredients, except for the one or more leavening agents and flour;
(ii) mixing ingredients
(iii) adding water and remaining liquid ingredients,
(iv) mixing to incorporate
(v) add flour and one or more leavening agents
(vi) mixing to incorporate into the dough
(vii) add inclusions
(viii) mixing to incorporate into the dough Preferably, the mixing in steps (i), (ii), (iv), (vi) and (viii) is carried out over a period of about 30 seconds to about 5 minutes, more preferably about 1 minutes to about 4 minutes.

Preferably, the mixing in steps (i), (ii) and (iv) is carried out in a horizontal or high shear mixer.

More preferably, the mixing in steps (i), (ii) and (iv), are carried out in a horizontal mixer over a period of about 1 minute to about 4 minutes, more preferably about 3 minutes and the mixing in step (vi) is carried out in a horizontal mixer over a period of about 1 minute to about 3 minutes, more preferably about 2.5 minutes and the mixing in step (viii) is carried out in a horizontal mixer over a period of about 10 seconds to about 2 minutes, more preferably less than 1 minute.

Shaping the Dough

Dough can be shaped (formed) using rotary moulded or extrusion equipment.

Preferably, the forming is carried out using extrusion equipment.

The terms "rotary mould", "rotary moulded", "rotary moulding" and alike have their standard meanings in the art, and refer to a method of forming or shaping the dough using a forcing roll, a moulding roll containing dies, and an extracting roll.

The terms "extrusion", "extruded", "extruding" and alike have their standard meanings in the art and refer to a method of forming or shaping the dough by forcing it through a die, then cutting the dough into the desired size. More than one dough can be extruded at once through using a conventional co-extrusion machine. These machines allow different proportions of doughs to be extruded simultaneously before the dough mixtures can be cut and shaped.

In a preferred embodiment, the cutting is done using a wire cutter.

In a preferred embodiment, the cookie precursor comprising a first and a second dough is co-extruded. In an embodiment, the resulting combined dough may be cut with a conventional wire cutter to produce a cookie precursor wherein the first dough is visible. For example, between 0 and 60% of the external surface area of the cookie precursor comprises a surface of the first dough, between 0 and 50%, between 0 and 40%, between 0 and 30%, between 0 and 20%, between 0 and 10%.

In preferred embodiment, between 0 and 50% of the surface area of the cookie precursor comprises a surface of the first dough.

In a preferred embodiment, the cookie precursor comprising a first and a second dough is co-extruded. The resulting combined dough is cut with a conventional iris cutter to produce a cookie precursor wherein the first dough is surrounded by the second dough.

Baking

The terms "bake", "baked", "baking" and alike have their standard meanings in the art and refer to a method of cooking the dough.

The baking temperature may be about 100° C. to about 200° C., preferably about 120° C. to about 190° C., more preferably about 130° C. to about 180° C., particularly preferably about 140° C. to about 180° C., even more preferably about 155° C. to about 175° C.

For example, the baking temperature may be about 130° C. to about 170° C., about 130° C. to about 160° C., about 130° C. to about 150° C., or about 130° C. to about 140° C. For example, the baking temperature may be about 140° C. to about 180° C., about 140° C. to about 170° C., about 140° C. to about 160° C., or about 130° C. to about 150° C. For example, the baking temperature may be about 150° C. to about 180° C., about 150° C. to about 170° C., or about 150° C. to about 160° C. For example, the baking temperature may be about 160° C. to about 180° C., or about 160° C. to about 170° C. For example, the baking temperature may be about 170° C. to about 180° C. For example, the baking temperature may be about 130° C., about 135° C., about 140° C., about 145° C., about 150° C., about 155° C., about 160° C., about 165° C., about 170° C., about 175° C. or about 180° C.

The baking time may be about 3 minutes to about 20 minutes, preferably about 4 minutes to about 15 minutes, more preferably about 5 to about 10 minutes, most preferably about 6 to about 8 minutes.

For example, the baking time may be about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, or about 20 minutes.

Preferably, the baking step is carried out at about 140° C. to about 180° C. for about 6 to about 12 minutes.

The baking step may be carried out at a humidity ratio of air of about 1 g to about 350 g of water vapour per kg of dry air, preferably about 10 g to about 220 g of water vapour per kg of dry air, as measured during baking using a digital humidity sensor (SCORPION@2 Data Logging Measurement System).

The terms "humidity ratio of air" and alike has its standard meaning in the art and refers to the mass of water vapour per unit mass of dry air.

The term "dry air" and alike have their standard meanings in the art and refers to a theoretical sample of air with no water vapour.

Cookie Product

As mentioned above, one aspect of the present invention relates to a cookie obtainable by baking the cookie precursor.

All wt % given are for the baked dough portion of the cookie and do not include any inclusions that may be present.

A further aspect relates to a cookie comprising particle sugar with a particle size D90 of less than 700 μm, a sugar syrup and a sugar alcohol, wherein the dry weight ratio of particle sugar to sugar in the sugar syrup is 4.75 or below and the weight ratio of particle sugar to sugar alcohol is 4.6 or below.

In a preferred embodiment, the baked cookie has at least two regions of different textures.

In a highly preferred embodiment, the inner region of the cookie has a softer, chewy texture and the outer region of the cookie has a crispy, crunchy texture.

In a highly preferred embodiment, the inner region of the cookie is formed from the first dough and the outer region of the cookie is formed from the second dough.

In an embodiment, the inner region of the cookie has a sugar content from the particle sugar of 7.5 wt % to 37.5 wt % sugar relative to the total weight of the inner region of the cookie.

Preferably, the inner region of the cookie has a sugar content from the particle sugar of about 12.5 wt % to about 32.5 wt %, more preferably about 17.5 wt % to about 28.5 wt %, most preferably about 20 wt % to about 26 wt % sugar relative to the total weight of the inner region of the cookie.

In an embodiment, the inner region of the cookie has a sugar alcohol content of about 4 wt % to about 27 wt % relative to the total weight of the inner region of the cookie.

Preferably, the inner region of the cookie has a sugar alcohol content of about 4.5 wt % to about 20 wt %, more preferably about 5 wt % to about 17.5 wt %, most preferably about 6 wt % to about 14 wt % relative to the total weight of the inner region of the cookie.

In an embodiment, the inner region of the cookie has a sugar syrup content of 7.5 wt % to about 33 wt % relative to the total weight of the inner region of the cookie.

Preferably, the inner region of the cookie has a sugar syrup content about 8 wt % to about 23 wt %, more preferably about 10 wt % to about 20 wt %, most preferably about 10 wt % to about 18 wt % sugar syrup relative to the total weight of the inner region of the cookie.

In an embodiment, the inner region of the cookie has an added fat content of 12.5 wt % to about 45 wt % relative to the total weight of the inner region of the cookie.

Preferably, the inner region of the cookie contains about 15 wt % to about 40 wt %, more preferably about 23 wt % to about 38 wt %, and most preferably about 27 wt % to about 35 wt % added fat relative to the total weight of the inner region of the cookie.

In an embodiment, the inner region of the cookie has a flour content of about 7.5 wt % to about 37 wt % relative to the total weight of the inner region of the cookie.

Preferably, the inner region of the cookie contains about 10 wt % to about 30 wt %, more preferably about 15 wt % to about 25 wt %, and most preferably about 18 wt % to about 24wt % flour relative to the total weight of the inner region of the cookie.

In an embodiment, the outer region of the cookie has a flour content of about 22 wt % to about 55 wt % relative to the total weight of the outer region of the cookie.

Preferably, the outer region of the cookie contains about 27 wt % to about 49 wt %, preferably about 29 wt % to about 47 wt %, more preferably about 29 wt % to about 45 wt %, flour relative to the total weight of the outer region of the cookie.

In an embodiment, the outer region of the cookie has an added fat content of about 7.5 wt % to about 30 wt % relative to the total weight of the outer region of the cookie.

Preferably, the outer region of the cookie contains about 8 wt % to about 28 wt %, more preferably about 9 wt % to about 25 wt %, and most preferably about 12 wt % to about 22 wt % added fat relative to the total weight of the outer region of the cookie.

In an embodiment, the outer region of the cookie has a sugar content from the particle sugar of about 12.5 wt % to about 55 wt % relative to the total weight of the outer region of the cookie.

Preferably, the outer region of the cookie has a sugar content from the particle sugar of about 13 wt % to about 50 wt %, more preferably about 18 wt % to about 38 wt %, more preferably about 26 wt % to about 37 wt %, most preferably about 29 wt % to about 36 wt % sugar relative to the total weight of the outer region of the cookie.

The water activity ($A_w$) as used herein is defined as the ratio between the vapor pressure of the food itself, when in a completely undisturbed balance with the surrounding air media and the vapor pressure of distilled water under identical conditions. An $A_w$ of 0.80 means the vapor pressure is 80 percent of that of pure water.

Preferably, the baked product has an $A_w$ of between 0.32 and 0.54, preferably between 0.33 and 0.53, more preferably between 0.34 and 0.52 and most preferably between 0.35 and 0.50.

In a preferred embodiment, the $A_w$ is measured using a water activity meter (for example from Novasina). It defines the $A_w$ by measuring the vapour pressure of a sample of the composition in closed chamber once equilibrium is reached. The vapour pressure is defined using a resistive-electrolytic sensor.

Preferably, the baked product has a total moisture content of about 2 wt % to about 9.0 wt %, preferably about 3 wt % to about 8 wt %, most preferably about 3.5 wt % to about 7 wt %, based on the weight of the product after baking. Any suitable method for measuring this moisture content is applicable, for instance, by thermogravimetric analysis, e.g. using a drying oven and calculating a loss on drying, or using an infra-red moisture analyser.

Preferably, the baked product moisture content is measured by thermogravimetric analysis, using a HB43 halogen moisture analyser (METTLER TOLEDO, USA), where 5 g of sample is heated at 125° C. with switch-off criterion 3, in triplicate.

Those skilled in the art will understand that they can freely combine all features of the present invention disclosed herein. In particular, features described for the product of the present invention may be combined with the process of the present invention and vice versa. Furthermore, features described for different embodiments of the present invention may be combined. Where known equivalents exist for specific features, such equivalents are incorporated as if specifically referred to in this specification. Further advantages and features of the present invention are apparent from the Figures and non-limiting Examples.

Preferred Embodiments

Preferred embodiments of the invention are set out below.

A cookie precursor comprising a dough, wherein the dough comprises particle sugar with a particle size D90 of less than 250 μm, a sugar syrup and a sugar alcohol, wherein the dry weight ratio of particle sugar to sugar in the sugar syrup is between 0.25 and 4.25 and the weight ratio of particle sugar to sugar alcohol is between 1.5 and 4,3.

A cookie precursor comprising a dough, wherein the dough comprises particle sugar with a particle size D90 of about 50 μm to about 140 μm, a sugar syrup and a sugar alcohol, wherein the dry weight ratio of particle sugar to sugar in the sugar syrup is between 1.5 and 3.0 and the weight ratio of particle sugar to sugar alcohol is between 1.5 and 4.15.

A cookie precursor comprising a dough, wherein the dough comprises particle sugar with a particle size D90 of about 70 μm to about 120 μm, a sugar syrup and a sugar alcohol, wherein the dry weight ratio of particle sugar to sugar in the sugar syrup is between 1.5 and 2.75 and the weight ratio of particle sugar to sugar alcohol is between 1.75 and 4.1.

A cookie precursor comprising a dough, wherein the dough comprises about 10 wt % to about 30 wt % particle sugar relative to the total weight of the dough, about 20 wt % to about 35 wt % added fat relative to the total weight of the dough, about 18 wt % to about 25wt % flour relative to the total weight of the dough a sugar syrup and a sugar alcohol, wherein the particle sugar has a particle size D90 of about 50 μm to about 140 μm, the dry weight ratio of particle sugar to sugar in the sugar syrup is between 1.5 and 3.0 and the weight ratio of particle sugar to sugar alcohol is between 1.5 and 4.15.

A cookie precursor comprising a dough, wherein the dough comprises about 15 wt % to about 26 wt % particle sugar relative to the total weight of the dough, about 25 wt % to about 33 wt % added fat relative to the total weight of the dough, about 18 wt % to about 22wt % flour relative to the total weight of the dough, a sugar syrup and a sugar alcohol, wherein the particle sugar has a particle size D90 of about 70 μm to about 120 μm, the dry weight ratio of particle sugar to sugar in the sugar syrup is between 1.5 and 2.75 and the weight ratio of particle sugar to sugar alcohol is between 1.75 and 4.1.

A cookie precursor comprising a first dough and a second dough, wherein the first dough comprises particle sugar with a particle size D90 of about 50 μm to about 140 μm, a sugar syrup and a sugar alcohol, wherein the dry weight ratio of particle sugar to sugar in the sugar syrup is between 1.5 and 3.0 and the weight ratio of particle sugar to sugar alcohol is between 1.5 and 4.15, wherein the ratio by weight of the first dough to the second dough is from about 10:90 to 60:40.

A cookie precursor comprising a first dough and a second dough, wherein the first dough comprises particle sugar with a particle size D90 of about 70 μm to about 120 μm, a sugar syrup and a sugar alcohol, wherein the dry weight ratio of particle sugar to sugar in the sugar syrup is between 1.5 and 2.75 and the weight ratio of particle sugar to sugar alcohol is between 1.75 and 4.1, wherein the ratio by weight of the first dough to the second dough is from about 25:75 to 45:55.

A cookie precursor comprising a first dough and a second dough, wherein the first dough comprises about 10 wt % to about 30 wt % particle sugar relative to the total weight of the first dough, about 20 wt % to about 35 wt % added fat relative to the total weight of the first dough, about 18 wt % to about 25wt % flour relative to the total weight of the first dough, a sugar syrup and a sugar alcohol, wherein the particle sugar has a particle size D90 of about 50 μm to about 140 μm, the dry weight ratio of particle sugar to sugar in the sugar syrup is between 1.5 and 3.0 and the weight ratio of particle sugar to sugar alcohol is between 1.5 and 4.15, wherein the ratio by weight of the first dough to the second dough is from about 34:66 to 38:62.

A cookie precursor comprising a first dough and a second dough, wherein the first dough comprises about 15 wt % to about 26 wt % particle sugar relative to the total weight of the first dough, about 25 wt % to about 33 wt % added fat relative to the total weight of the first dough, about 18 wt % to about 22wt % flour relative to the total weight of the first dough, a sugar syrup and a sugar alcohol, wherein the particle sugar has a particle size D90 of about 70 μm to about 120 μm, the dry weight ratio of particle sugar to sugar in the sugar syrup is between 1.5 and 2.75 and the weight ratio of particle sugar to sugar alcohol is between 1.75 and 4.1, wherein the ratio by weight of the first dough to the second dough is from about 35:65 to 37:63.

A cookie precursor comprising a first dough and a second dough, wherein the first dough comprises about 10 wt % to about 30 wt % particle sugar relative to the total weight of the first dough, about 20 wt % to about 35 wt % added fat relative to the total weight of the first dough, about 18 wt % to about 25wt % flour relative to the total weight of the first dough, a sugar syrup and a sugar alcohol, wherein the particle sugar has a particle size D90 of about 50 μm to about 140 μm, the dry weight ratio of particle sugar to sugar in the sugar syrup is between 1.5 and 3.0 and the weight ratio of particle sugar to sugar alcohol is between 1.5 and 4.15, wherein the ratio by weight of the first dough to the second dough is from about 34:66 to 38:62 and the second dough contains about 30 wt % to about 43 wt % flour relative to the total weight of the second dough.

A cookie precursor comprising a first dough and a second dough, wherein the first dough comprises about 15 wt % to about 26 wt % particle sugar relative to the total weight of the first dough, about 25 wt % to about 33 wt % added fat relative to the total weight of the first dough, about 18 wt % to about 22wt % flour relative to the total weight of the first dough, a sugar syrup and a sugar alcohol, wherein the particle sugar has a particle size D90 of about 70 μm to about 120 μm, the dry weight ratio of particle sugar to sugar in the sugar syrup is between 1.5 and 2.75 and the weight ratio of particle sugar to sugar alcohol is between 1.75 and 4.1, wherein the ratio by weight of the first dough to the second dough is from about 35:65 to 37:63 and the second dough contains about 33 wt % to about 43 wt % flour relative to the total weight of the second dough.

EXAMPLES

The invention will now be further described by way of examples, which are intended to illustrate to and assist the skilled person in carrying out the invention and are not intended in any way to limit the scope of the invention.

Example 1

The particle size distribution of two sizes of particle sugar was measured. Specifically, granulated sugar and powdered sugar were measured using a MasterSizer® 3000 laser diffraction particle size analyser (Malvern Instruments Ltd, UK). Before the analysis, the sample was placed into an automatic dry dispersion unit (Aero S, Malvern Instruments Ltd, UK). The measurements were performed in accordance with the Mie theory, considering an absorption and refractive index for sucrose of 0.01 and 1.538, respectively. Data were collected using MasterSizer® 3000 software. Both granulated and powdered sugar presented unimodal distributions. However, 90% of particles (D90, based on a volume distribution) had a diameter of or below 978 μm in granulated sugar, whereas this value dropped to 98 μm in powdered sugar.

Example 2

Cookie doughs were prepared using the ingredients listed in Table 1 and 2.

For the internal dough, the fat was combined at room temperature (24° C.) along with the emulsifiers (polyglycerol polyricinoleate (PGPR)and lecithin) and the other powder ingredients in the following order; sugar, flour, egg powder and salt. The dough was then mixed using a horizontal mixer at 85 rpm for 30 seconds, before the speed was increased to 166 rpm for 90 seconds. The flavour was combined with the fructose syrup and this was added to the dough with the molasses and glycerol. The dough was then mixed for 60 seconds at 166 rpm.

For the external dough, the fat was combined with the powder ingredients (except for the raising agents and flour) at room temperature (24° C.). This was then mixed using a horizontal mixer at 166 rpm for 180 seconds. The water, syrups and the flavour were added and mixed at 166 rpm for 150 seconds. The flour and raising agents were then added and the dough mixed at 166 rpm for 90 seconds. Finally, chocolate chips were added and the dough mixed at 85 rpm for 40 seconds.

The cookie precursors were formed by hand using 7.0 g of inner dough and 12.5 g of external dough so as to encompass the internal dough completely in the external dough.

The cookies were baked in an oven in three stages. Pre-heating: 170° C. at 15% humidity for 30 seconds. Stage 1: 160° C. for 4 minutes 30 seconds at 15% humidity. Stage 2: 170° C. for 6 minutes 20 seconds at 0% humidity.

All Examples A-C exhibited a dual texture after baking of a chewy interior and crunchy exterior that persisted after 2 weeks stored at ambient temperature (20° C.) in an airtight container.

Texture was assessed by experienced biscuit manufactures by simply breaking and consuming the cookie.

It is understood that if the texture is stable at two weeks, it will remain stable for up to 9 months following storage under appropriate conditions as described above.

TABLE 1

Amounts of ingredients used to form the
dough for the interior of the cookie

| Internal Dough | Example A Wt % in dough | Example B Wt % in dough | Example C Wt % in dough |
|---|---|---|---|
| Palm Oil (melting point 37-39° C.) | 30.00 | 30.00 | 30.00 |
| Particle Sugar (D90 45 μm) | 20.00 | 20.00 | 23.20 |
| Fructose syrup (55%, Dry matter 76.5-77.5 g/100 g.) | 14.80 | 10.00 | 8.40 |
| Molasses | 3.00 | 3.00 | 3.00 |
| PGPR and Lecithin | 0.60 | 0.60 | 0.60 |
| Glycerol | 5.20 | 10.00 | 8.40 |
| Vanilla Flavour | 0.40 | 0.40 | 0.40 |
| Egg Powder | 5.00 | 5.00 | 5.00 |
| Wheat Flour (Gluten 7.4% Bulk) | 20.53 | 20.53 | 20.53 |
| Salt | 0.47 | 0.47 | 0.47 |
| Total Before Baking | 100 | 100 | 100 |

TABLE 2

Amounts of ingredients used to form the
dough for the exterior of the cookie

| External Dough | Wt % in dough |
|---|---|
| Wheat Flour (Gluten 7.4% Bulk) | 38.26 |
| Particle Sugar (D90 750 μm) | 31.01 |
| Molasses | 1.55 |
| Palm Oil (melting point 37-39° C.) | 15.17 |
| Sodium bicarbonate and monocalcium orthophosphate | 0.71 |
| Salt | 0.93 |
| Flavour | 0.17 |
| Egg Powder | 3.55 |
| Water | 8.65 |
| Total Before Baking | 100.00 |
| Chocolate Chips | 22 parts per weight based on 100 parts per weight dough |

Comparative Example 1

Cookies were prepared using the external dough recipe from Example 2 and the ingredients listed in Table 3 for the internal dough. The same method as in Example 2 was followed to produce the baked cookies. The cookies were dry and crumbly and did not have the freshly baked dual texture after baking or after storage under appropriate conditions as described above.

TABLE 3

Amounts of ingredients used to form the
dough for the interior of the cookies

| Internal Dough | Ref. Ex. A Wt % in dough | Ref. Ex. B Wt % in dough | Ref. Ex. C Wt % in dough | Ref. Ex. D Wt % in dough |
|---|---|---|---|---|
| Palm Oil (melting point 37-39° C.) | 30.00 | 30.00 | 30.00 | 30.00 |
| Particle Sugar (D90 45 μm) | 29.60 | 20.00 | 24.80 | 24.80 |

TABLE 3-continued

Amounts of ingredients used to form the
dough for the interior of the cookies

| Internal Dough | Ref. Ex. A Wt % in dough | Ref. Ex. B Wt % in dough | Ref. Ex. C Wt % in dough | Ref. Ex. D Wt % in dough |
|---|---|---|---|---|
| Fructose syrup (55%, Dry matter 76.5-77.5 g/100 g.) | 5.20 | 5.20 | 10.00 | 5.20 |
| Molasses | 3.00 | 3.00 | 3.00 | 3.00 |
| PGPR and Lecithin | 0.60 | 0.60 | 0.60 | 0.60 |
| Glycerol | 5.20 | 14.80 | 5.20 | 10.00 |
| Flavour | 0.40 | 0.40 | 0.40 | 0.40 |
| Egg Powder | 5.00 | 5.00 | 5.00 | 5.00 |
| Wheat Flour (Gluten 7.4% Bulk) | 20.53 | 20.53 | 20.53 | 20.53 |
| Salt | 0.47 | 0.47 | 0.47 | 0.47 |
| Total Before Baking | 100 | 100 | 100 | 100 |

Comparative Example 2

Cookies were prepared using the external dough recipe from Example 2 and the ingredients listed in Table 4 for the internal dough. The same method as in Example 2 was followed to produce the baked cookies. The cookies formed did not have the desired dual texture; the outer shell of the cookie did not remain crisp/crunchy and the cookie exhibited oiling out when baked.

TABLE 4

Amounts of ingredients used to form the
dough for the interior of the cookie

| Internal Dough | Ref. Ex. E Wt % in dough |
|---|---|
| Palm Oil (melting point 37-39° C.) | 43.00 |
| Particle Sugar (D90 750 μm) | 16.71 |
| Fructose syrup (55%, Dry matter 76.5-77.5 g/100 g.) | 5.10 |
| Molasses | 3.00 |
| Corn Starch Expander | 2.50 |
| Glycerol | 7.77 |
| Flavour | 0.40 |
| Egg Powder | 5.00 |
| Wheat Flour (Gluten 7.4% Bulk) | 16.05 |
| Salt | 0.47 |
| Total Before Baking | 100 |

Comparative Example 3

Cookies were prepared using the external dough recipe from Example 2 and the ingredients listed in Table 5 for the internal dough. The same method as in Example 2 was followed to produce the baked cookies with the additions of the soy protein when the egg powder was added, and for Reference Example L the fats were melted at 45-50° C. until no visible solid fat remained prior to mixing. Reference Examples F, H and J were chewy but very dense and the dough would have issues with industrial processability as the weight ratios of particle sugar to sugar syrup and sugar alcohol were too high. Reference Example G had a uniformly chewy texture markedly improved from when granulated sugar was used but did not have the desired dual texture as the weight ratios of particle sugar to sugar syrup and sugar alcohol were too high. Reference Examples I, K and M were very soft and crumbly and did not provide the chewy interior that is characteristic of a freshly baked cookie that was aimed for. Reference Examples L and N were dryer and harder than desired as the weight ratios of particle sugar to sugar syrup were too high. Reference Example O had phase separation, a tight inner structure and did not exhibit the sought after dual texture.

TABLE 5

| | | | | | Amounts of ingredients used to form the dough for the interior of the cookies | | | | | |
|---|---|---|---|---|---|---|---|---|---|---|
| Internal Dough | Ref. Ex. F Wt % in dough | Ref. Ex. G Wt % in dough | Ref. Ex. H Wt % in dough | Ref. Ex. I Wt % in dough | Ref. Ex. J Wt % in dough | Ref. Ex. K Wt % in dough | Ref. Ex. L Wt % in dough | Ref. Ex. M Wt % in dough | Ref. Ex. N Wt % in dough | Ref. Ex. O Wt % in dough |
| Palm Oil (melting point 37-39° C.) | 30.00 | 30.00 | 20.00 | 30.00 | 0.00 | 20.00 | 30.00 | 30.00 | 30.00 | 30.00 |
| High melting point fat (AKOCREAM) | 0.00 | 0.00 | 0.00 | 0.00 | 30.00 | 0.00 | 0.00 | 0.00 | 0.00 | 0.00 |
| Particle Sugar (D90 750 μm) | 29.17 | 0.00 | 38.77 | 26.07 | 29.17 | 0.00 | 29.17 | 29.17 | 29.17 | 29.77 |
| Particle Sugar (D90 45 μm) | 0.00 | 29.17 | 0.00 | 0.00 | 0.00 | 33.90 | 0.00 | 0.00 | 0.00 | 0.00 |
| Fructose syrup (55%, Dry matter 76.5-77.5 g/ 100 g.) | 5.10 | 5.10 | 5.10 | 5.10 | 5.10 | 0.00 | 5.10 | 0.00 | 5.10 | 5.10 |
| Molasses | 3.00 | 3.00 | 3.00 | 3.00 | 3.00 | 0.00 | 3.00 | 0.00 | 3.00 | 3.00 |
| PGPR and Lecithin | 0.60 | 0.60 | 1.00 | 0.60 | 0.60 | 0.60 | 0.60 | 0.60 | 0.60 | 0.00 |
| Glycerol | 7.76 | 7.76 | 7.76 | 7.76 | 7.76 | 27.00 | 7.76 | 15.86 | 7.76 | 7.76 |
| Flavour | 0.40 | 0.40 | 0.40 | 0.40 | 0.40 | 0.00 | 0.40 | 0.40 | 0.40 | 0.40 |
| Egg Powder | 5.00 | 5.00 | 5.00 | 5.00 | 5.00 | 0.00 | 5.00 | 5.00 | 5.00 | 5.00 |
| Wheat Flour (Gluten 7.4% Bulk) | 18.50 | 18.50 | 18.50 | 18.50 | 18.50 | 18.50 | 18.50 | 18.50 | 18.50 | 18.50 |
| Soy protein | 0.00 | 0.00 | 0.00 | 3.10 | 0.00 | 0.00 | 0.00 | 0.00 | 0.00 | 0.00 |
| Salt | 0.47 | 0.47 | 0.47 | 0.47 | 0.47 | 0.00 | 0.47 | 0.47 | 0.47 | 0.47 |
| Total Before Baking | 100 | 100 | 100 | 100 | 100 | 100 | 100 | 100 | 100 | 100 |

A summary of the examples above including the particle sugar sizes and ratios of particle sugar to sugar syrup and sugar alcohol is given in Table 6 below. From this only Examples A-C were made according to the present invention. Reference Examples A-O all fall outside of the claimed ranges. Only Examples A-C demonstrated the freshly baked dual texture that persisted for 2 weeks after baking after storage under appropriate conditions as described above. All of the Reference Examples had unsatisfactory texture within 2 weeks of baking after storage under appropriate conditions as described above.

TABLE 6

Summary of examples. Claimed ranges of the present invention are a sugar particle size (D90) <700 μm, ratio particle sugar to sugar syrup ≤4.75 and ration particle sugar to sugar alcohol ≤4.60.

| Example | Sugar particle size in μm (D90) | Dry weight ratio of particle sugar to sugar in the sugar syrup | Weight ratio of particle sugar to sugar alcohol |
|---|---|---|---|
| A | 45 | 1.76 | 3.85 |
| B | 45 | 2.60 | 2.00 |
| C | 45 | 3.59 | 2.76 |
| Reference Example A | 45 | 7.39 | 5.69 |
| Reference Example B | 45 | 5.00 | 1.35 |
| Reference Example C | 45 | 3.22 | 4.77 |
| Reference Example D | 45 | 6.19 | 2.48 |
| Reference Example E | 750 | 4.26 | 3.76 |
| Reference Example F | 750 | 7.43 | 3.76 |
| Reference Example G | 45 | 7.43 | 5.00 |
| Reference Example H | 750 | 9.87 | 3.36 |
| Reference Example I | 750 | 6.64 | 3.76 |
| Reference Example J | 750 | 7.43 | 1.26 |
| Reference Example K | 45 | N/A | 3.76 |
| Reference Example L | 750 | 7.43 | 1.84 |
| Reference Example M | 750 | N/A | 3.76 |
| Reference Example N | 750 | 7.43 | 3.84 |
| Reference Example O | 750 | 7.58 | 2.15 |

The $A_w$ of the center of the baked cookies from Example 2 and Comparative Example 1 was measured using a water activity meter (LabTouch AW, Novasina) at 25° C. The resulting Aw is given below in Table 7.

TABLE 7

Water Activity of the baked cookies measured using a water activity meter.

| Example | Aw |
|---|---|
| A | 0.46 |
| B | 0.37 |
| C | 0.39 |
| Reference Example A | 0.53 |
| Reference Example B | 0.41 |
| Reference Example C | 0.44 |
| Reference Example D | 0.44 |

The invention claimed is:

1. A cookie precursor comprising a first dough, wherein the first dough comprises particle sugar with a particle size D90 of less than 700 μm, a sugar syrup and a sugar alcohol, wherein the dry weight ratio of particle sugar to sugar in the sugar syrup is 4.75 or below, and the weight ratio of particle sugar to sugar alcohol is 4.6 or below, further comprising a second dough, and wherein the first dough is entirely encompassed by the second dough.

2. The cookie precursor according to claim 1, wherein the particle sugar is present in an amount between 5 wt % and 35 wt % by weight of the first dough.

3. The cookie precursor according to claim 1, wherein the sugar syrup is between 5 wt % and 30 wt % by weight of the first dough.

4. The cookie precursor according to claim 1, wherein the sugar syrup is a fructose syrup, a dextrose syrup, and/or a combination of these.

5. The cookie precursor according to claim 1, wherein the sugar alcohol is between 2.5 wt % and 25 wt % by weight of the first dough.

6. The cookie precursor according to claim 1, wherein the first dough comprises:
at least one added fat in an amount between 10 and 40 wt % by weight of the first dough;
and/or flour in an amount between 5 and 35 wt % by weight of the first dough.

7. The cookie precursor according to claim 1, wherein the ratio by weight of the first dough to the second dough is from 10:90 to 60:40.

8. The cookie precursor according to claim 7, wherein the second dough comprises at least 20 wt % flour.

9. The cookie precursor according to claim 1, wherein the particle size D90 of the particle sugar in the first dough is less than 250 μm, wherein the dry weight ratio of particle sugar to sugar in the sugar syrup is between 0.25 and 4.25, and the weight ratio of particle sugar to sugar alcohol is between 1.5 and 4.3.

10. A cookie obtainable by baking the cookie precursor of claim 1.

11. A cookie comprising particle sugar with a particle size D90 of less than 700 μm, a sugar syrup and a sugar alcohol, wherein the dry weight ratio of particle sugar to sugar in the sugar syrup is 4.75 or below and the weight ratio of particle sugar to sugar alcohol is 4.6 or below,
the cookie further comprising a first portion of baked dough and a second portion of baked dough, wherein the first portion of baked good comprises the particle sugar, the sugar syrup and the sugar alcohol.

12. The cookie according to claim 10, wherein the cookie has a multi-texture that is shelf stable for at least 6 months when stored at 20° C.

13. The cookie according to claim 10, wherein the cookie has an Aw of from 0.30 to 0.55, and/or wherein the cookie has a moisture content of from 3 to 9 wt %.

14. The cookie precursor according to claim 1, wherein the first dough comprises flour in an amount between 10 and 30 wt % by weight of the first dough.

15. The cookie precursor according to claim 1, wherein the second dough comprises at least 25 wt % flour.

16. The cookie precursor according to claim 1, wherein the first dough comprises flour in an amount between 15 and 35 wt % by weight of the first dough.

* * * * *